(12) United States Patent
Kothuri et al.

(10) Patent No.: US 7,219,108 B2
(45) Date of Patent: *May 15, 2007

(54) QUERY PRUNNING USING EXTERIOR TILES IN AN R-TREE INDEX

(75) Inventors: Ravi Kanth V. Kothuri, Nashua, NH (US); Daniel Geringer, Reston, VA (US); Siva Kumar Ravada, Nashua, NH (US); Daniel Abugov, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 10/841,540

(22) Filed: May 10, 2004

(65) Prior Publication Data

US 2004/0215641 A1  Oct. 28, 2004

Related U.S. Application Data

(63) Continuation-in-part of application No. 09/886,487, filed on Jun. 22, 2001, now Pat. No. 7,080,065.

(51) Int. Cl.
*G06F 17/00* (2006.01)

(52) U.S. Cl. .................................. 707/104.1; 707/100
(58) Field of Classification Search ................ 707/1–7, 707/100, 104.1; 382/261; 345/419, 441
See application file for complete search history.

(56) References Cited

U.S. PATENT DOCUMENTS

| | | | |
|---|---|---|---|
| 5,428,744 A | 6/1995 | Webb et al. | |
| 5,710,916 A | 1/1998 | Barbara et al. | |
| 5,963,956 A | 10/1999 | Smartt | |
| 5,988,853 A | 11/1999 | Kim et al. | |
| 6,084,595 A | 7/2000 | Bach et al. | |
| 6,115,717 A | 9/2000 | Mehrotra et al. | |
| 6,148,295 A | 11/2000 | Megiddo et al. | |
| 6,154,746 A | 11/2000 | Berchtold et al. | |
| 6,252,605 B1 | 6/2001 | Beesley et al. | |
| 6,263,334 B1 | 7/2001 | Fayyad et al. | |
| 6,308,177 B1 | 10/2001 | Israni et al. | |
| 6,438,269 B1 | 8/2002 | Kim et al. | |

OTHER PUBLICATIONS

Kim et al., "Development of multi-step filtering processor", IEEE 1999, pp. 169-176.

Silva et al., "An Exact Interactive Time Visibility Ordering Algorithm for Polyhedral Cell Complexes", IEEE 1998, pp. 87-94.

P. Fischer et al., "Computing a maximum axis-aligned rectangle in a convex polygon", Information Processing Letters 51 (1994), pp. 189-193.

(Continued)

*Primary Examiner*—Uyen Le
(74) *Attorney, Agent, or Firm*—Bingham McCutchen LLP

(57) ABSTRACT

Determining relationships among objects represented in a database includes defining a plurality of tiles in the approximation of the first geometry by dividing the approximation of the first geometry in a first direction a plurality of times and dividing the approximation of the first geometry in a second direction perpendicular to the first direction a plurality of times. A second geometry is analyzed to determine if it fulfills a first filter condition with respect to any of the tiles defined in the approximation of the first geometry. If the second geometry fulfills the first filter condition with respect to any of the tiles defined in the first geometry carrying out a mathematical comparison of the first geometry and the second geometry.

20 Claims, 7 Drawing Sheets

OTHER PUBLICATIONS

R. Kothuri et al., "Efficient Processing of Large Spatial Queries Using Interior Approximations", Advances in Spacial and Temporal Databases, Lecture Notes in Computer Science, 2121, pp. 404-424, Redondo Beach, CA, Jul. 2001.

H. Alt et al., Computing the Largest Inscribed Isothetic Rectangle, pp. 1-8, Proc. 7th Canadian Conference Computational Geometry, Universit'e Laval, Qu'ebec, Aug. 1995.

K. Kanth et al., "Indexing Medium-Dimensionality Data in Oracle", Proc. Of ACM SIGMOND Int'l. Conference on Management of Data, pp. 521-522, Jun. 1999.

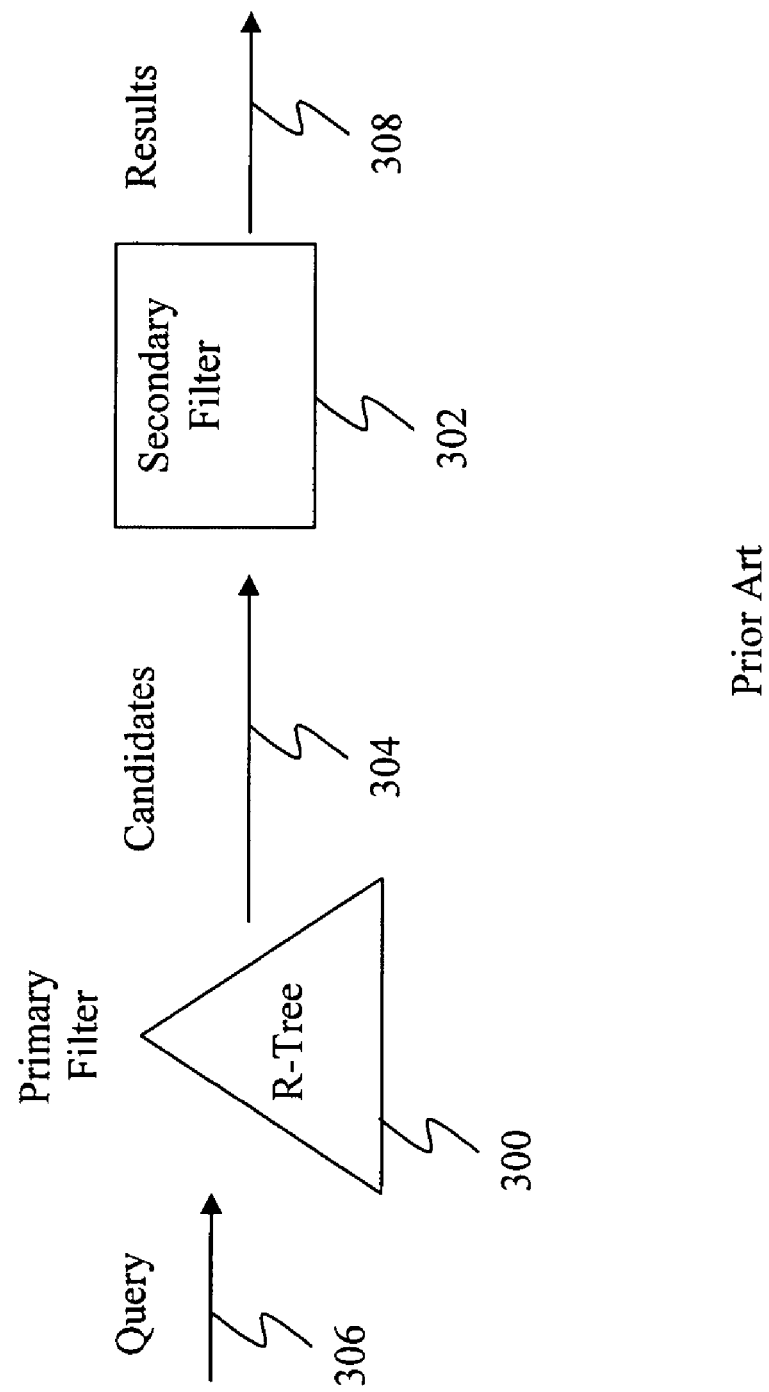

QUERY PRUNNING USING EXTERIOR TILES IN AN R-TREE INDEX

CROSS-REFERENCE TO RELATED APPLICATIONS

This application is a continuation-in-part of U.S. application Ser. No. 09/886,487, filed Jun. 22, 2001, now U.S. Pat. No. 7,080,065 of which the entire disclosure is incorporated by reference herein.

BACKGROUND OF THE INVENTION

1. Field of the Invention

The present invention relates to a method, a system, and a computer program product for accessing and utilizing information in a database. More particularly, the present invention relates to a method, a system, and a computer program product for determining relationships between a query object and objects in a database.

2. Description of the Prior Art

Databases are used to organize information according to any number of techniques. Database types include, but are not limited to, Quadtrees, B-trees, and R-trees. Each of these database types is more suitable for storing and organizing a particular type of data. Generally, R-trees are used to store multi-dimensional data. These R-trees store spatial objects formed by aggregating minimum bounding contours. Each node in an R-tree represents a region in space. A child node of a node in an R-tree represents a sub-region of the region in space represented by the node.

The number of objects that are aggregated in each node is permitted to range between $m \leq (M/2)$ and M, thereby leading to the use of the prefix (m, M) to characterize a particular R-tree and mirror the effects of a B-tree. The root node in an R-tree has at least two entries unless it is a leaf node, in which case it has just one entry corresponding to the minimum bounding contour of an object. The R-tree is height-balanced with the maximum height represented by $\log_m r$.

An R-tree is constructed in either a dynamic or a static manner. Dynamic construction of an R-tree builds the R-tree as objects are input into the R-tree. Static construction of an R-trees builds the R-tree after all the objects have been input into the R-tree. Statically constructed R-trees are usually characterized as being packed since knowing all of the data in advance permits each R-tree node to be filled to its maximum capacity.

An R-tree can include data concerning locations of features in space or on a surface. Spatial data can include geometric data that includes simple primitive elements such as lines, curves, polygons (with and without holes), compound elements that are made up of a combination of the primitive elements, and geographical data concerning the location of various objects in a region. Geographical data can include mathematical representations of counties, cities, homes, apartment buildings, parks, businesses, subway stations, and other features. The geographical data can be in the form of latitude and longitude or other data that defines position.

Once an R-tree is created it is typically desired to access and utilize the data stored in the R-tree. One way that the data in an R-tree is utilized involves determining the relative positions of particular objects, such as finding certain types of businesses in a zip code. The analysis of objects in spatial and/or geographic databases, such as R-trees, to determine relationships, such as overlapping regions and point-by-point continuity, is performed using sophisticated mathematical algorithms.

Typically, these mathematical algorithms implement a post-processing function to a candidate query result set to generate a final result set. The post-processing function includes loading each object in the candidate query result set and performing an exact point-by-point comparison of each object in the final result set with a query object. The loading of each object in the candidates query result set and comparing each object in the candidate query result set to the query object uses a substantial amount of memory and computing power, takes an unacceptable period of time, and costs a substantial amount of money.

Thus, there is a need for a method of determining relationships between a query object and objects in a database. There is a need for the method to reduce the number of geometries in a candidate result set. There is a need for the method to be applicable where query objects are large or small. There is a need for the method to decrease the amount of time required to execute the mathematical algorithm for determining relationships between objects. There is a need for the method to be applicable to large geographical databases.

SUMMARY OF THE INVENTION

According to embodiments of the present invention, a method, a framework, and a computer program product for determining relationships between a query object and objects in a database are provided. The present invention provides a fast and simple method for determining whether two objects, or geometries, defined by data in a database intersect. The present invention eliminates many candidate geometries from undergoing an expensive secondary filter by including an intermediate filter that can eliminate many, if not most, geometries from a candidate result set. In an embodiment of the present invention, the intermediate filter is a two step process applicable to geometries including line strings, concentric circles, rectangles, curves, polygons (with and without holes), and compound structures. In an embodiment of the present invention, the intermediate filter is a one step process applicable to geometries including line strings, concentric circles, rectangles, curves, polygons (with and without holes), and compound structures. The present invention is particularly useful where the query geometry is particularly large or particularly small. The identification of candidate geometries whose minimum bounding rectangles (MBRs) intersect all rectangles of a query geometry or intersect interior rectangles of a query geometry can eliminate those candidate geometries from undergoing a costly exact mathematical comparison algorithm. By reducing calculation time, the present invention can free up a processor to perform other calculations, and other functions.

BRIEF DESCRIPTION OF THE DRAWINGS

The above described features and advantages of the present invention will be more fully appreciated with reference to the detailed description and appended figures in which:

FIG. 3 depicts an exemplary block diagram of a solution for solving window queries;

DETAILED DESCRIPTION OF THE INVENTION

The present invention is now described more fully hereinafter with reference to the accompanying drawings that show exemplary embodiments of the present invention. The present invention, however, can be embodied in many different forms and should not be construed as limited to the exemplary embodiments set forth herein. Appropriately, these embodiments are provided so that this disclosure will be thorough, complete, and fully convey the scope of the present invention.

According to embodiments of the present invention, a method, a framework, and a computer program product for determining relationships between a query object and objects in a database are provided. The present invention provides a fast and simple method for determining whether two objects, or geometries, defined by data in a database intersect. The present invention eliminates many candidate geometries from undergoing an expensive secondary filter by including an intermediate filter that can eliminate many, if not most, geometries from a candidate result set. In an embodiment of the present invention, the intermediate filter is a two step process applicable to geometries including line strings, concentric circles, rectangles, curves, polygons (with and without holes), and compound structures. In an embodiment of the present invention, the intermediate filter is a one step process applicable to geometries including line strings, concentric circles, rectangles, curves, polygons (with and without holes), and compound structures. The present invention is particularly useful where the query geometry is particularly large or particularly small. The identification candidate geometries that intersect all rectangles of a query geometry can eliminate those candidate geometries from undergoing a costly exact mathematical comparison algorithm. By reducing calculation times, the present invention can free up a processor to perform other calculation, and other functions.

Figure 1:
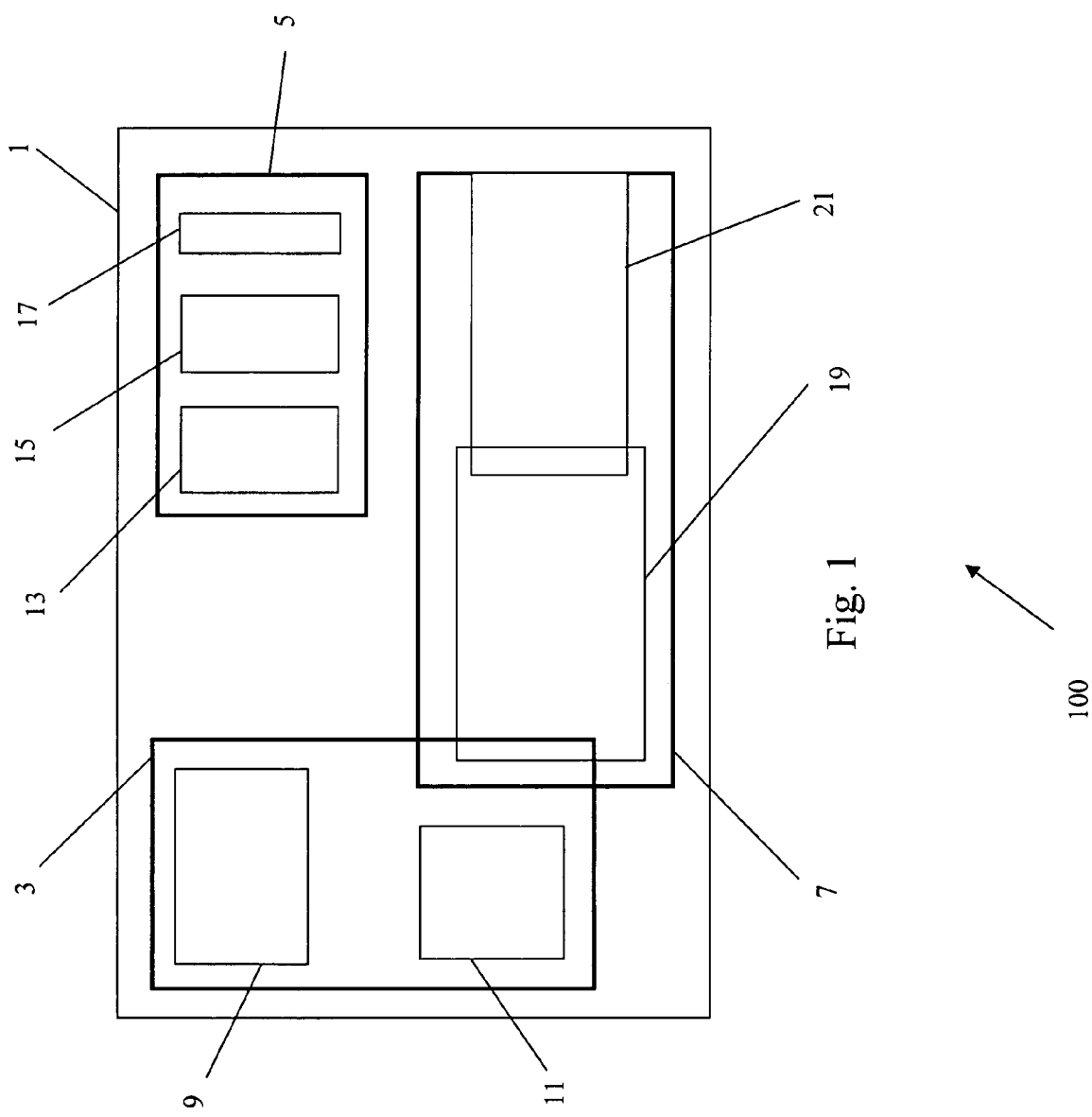
FIG. 1 depicts an exemplary example of an R-tree according to an embodiment of the present invention.

FIG. 1 depicts an exemplary R-tree according to an embodiment of the present invention. The R-tree 100 shown in the FIG. 1 embodiment of the present invention includes a plurality of objects. An R-tree may be utilized to index the objects including, but not limited to, points, lines, rectangles, and the like. The objects may be represented by minimum bounding contours. Additionally, the objects may be grouped based on their minimum bounding contours. In the FIG. 1 embodiment of the present invention, the minimum bounding contours are rectangles, referred to herein as minimum bounding rectangles (MBRs).

In the FIG. 1 embodiment of the present invention, the R-tree includes a node and two levels of child nodes. In the FIG. 1 embodiment of the present invention, the node 1 includes minimum bounding contours 3, 5, and 7, representing a first level of children. Each child node 3, 5, and 7, in turn, includes a plurality of child nodes, representing second levels of children. Child node 3 includes second level child nodes 9 and 11. Child node 5 includes second level child nodes 13, 15, and 17. Child node 7 includes second level child nodes 19 and 21. Each child node is defined by a minimum bounding contour.

The R-tree may be utilized to support medium-dimensionality data, such as data having a dimensionality in the range of 3–10. The R-tree index may be implemented utilizing an extensible indexing framework. One example of such a framework is referred to as cooperative indexing in Oracle8i, available from Oracle Corporation. This framework can allow easy creation and maintenance of domain-specific index structures on top of a server layer while reaping the full benefits of operating within a database framework. As a consequence, the R-tree inherits features such as transactional semantics, integrated backup and recovery, security, and replication from the underlying database.

An R-tree can support a variety of operation types. R-tree operation types include, but are not limited to, window queries, nearest-neighbor queries, and intersection join queries. A window query operation includes, but is not limited to, specifying a query window, such as an object, and identifying database objects having MBRs that interact with the query window. Interactions with a query window include, but are not limited to, intersections, containments, enclosures and exact-matches.

A nearest-neighbor query operation includes, but is not limited to, specifying a query point, and retrieving the closest data k MBRs to the query point. An intersection join query operation includes, but is not limited to, identifying the data items of two different datasets that intersect with each other using the MBRs of the data items. For some applications, such as GIS data where the bounding rectangles only represent first-level approximations of the data items, the query result may have to be post-processed using the complete extents of the data items to obtain the final result.

A number of relationships can exist between and among objects represented in an R-tree. Relationships between and among objects include, but are not limited to, objects overlapping, an object lying entirely within another object, object boarders intersecting, and objects having no overlap. Typically, to determine whether objects interact in a specific manner a "query" geometry is provided, and geometries in the database, or "data geometries", are identified that do or do not interact in the specific manner with the query geometry. Interactions include, but are not limited to, intersections, inside, coveredby, contains, covers, touches, equals and within distance.

An intersection interaction identifies data geometries that intersect a query geometry. An inside interaction identifies data geometries that are "completely inside" a query geometry. A coveredby interaction identifies data geometries that "touch" on at least one border and are inside a query geometry otherwise. A contains interaction is the reverse of the inside interaction, where all data geometries for which a query geometry is completely inside are identified. A covers interaction identifies data geometries that are the reverse of the data geometries identified by the covered by interaction, where data geometries for which a query geometry touches on at least one border and is otherwise inside are identified. A touch interaction identifies data geometries that only "touch" a query geometry, but are otherwise disjoint. An equal interaction identifies data geometries that are exactly the same as a query geometry. A within distance interaction identifies data geometries that are within a specified distance from a query geometry.

Figure 2:
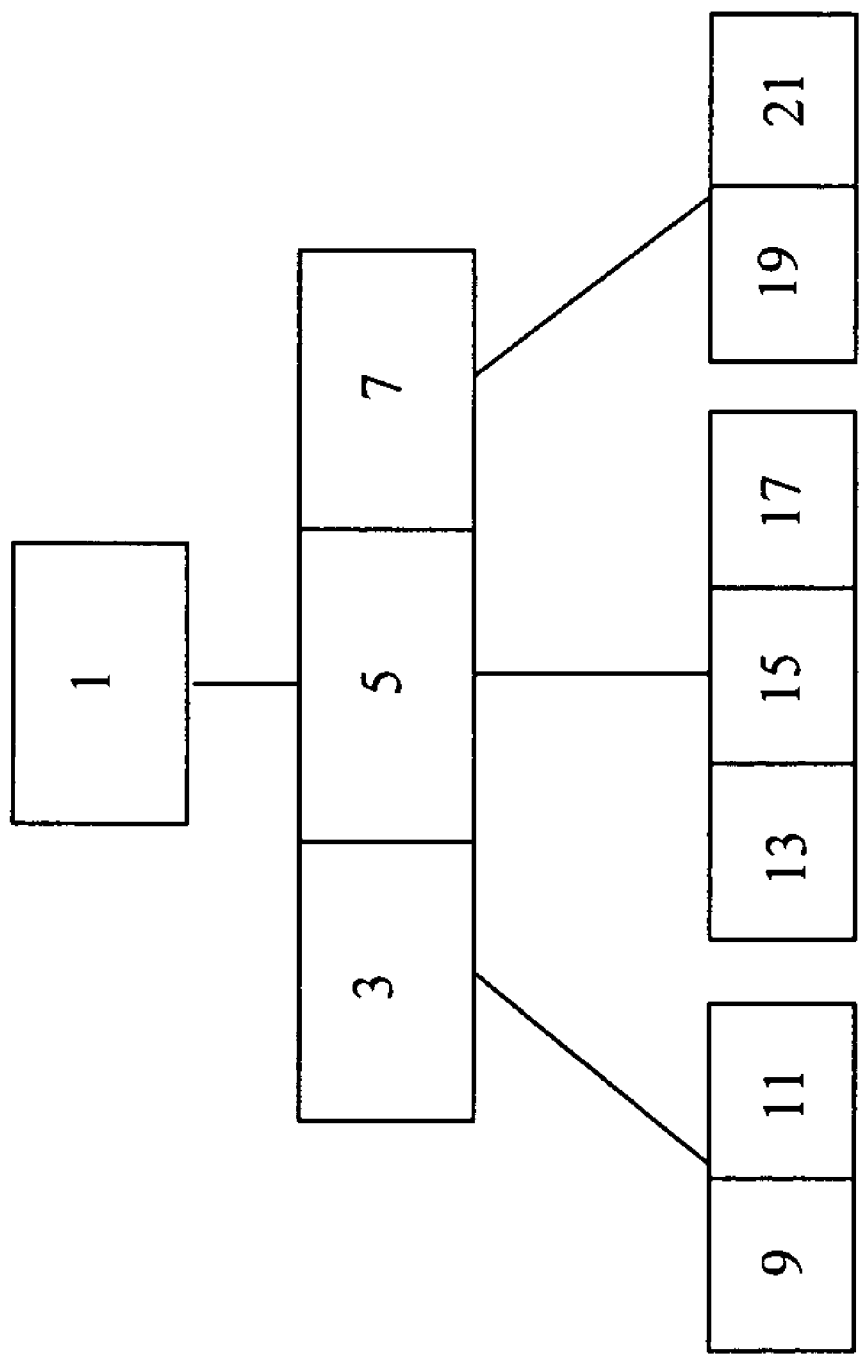
FIG. 2 depicts an exemplary block diagram of the R-tree shown in FIG. 1 according to an embodiment of the present invention.

In the FIG. 2 embodiment of the present invention, objects stored in different nodes of the R-tree of FIG. 1 are shown. In the FIG. 2 embodiment of the present invention, the more remote common ancestor nodes are to one another, the greater the difference between the objects in the nodes are likely to be. For example, strokes or strings stored in leaf nodes having a common parent are likely to be more similar to each other than strokes or strings stored in leaf nodes only having a common grandparent.

In the FIG. 3 embodiment of the present invention, a method of solving window queries is shown. In the FIG. 3 embodiment of the present invention, the method of solving window queries includes a first stage 300 and a second stage 302. In the first stage 300, referred to as a primary filter, all candidate data geometries/objects 304 in the R-tree that could possibly satisfy a given query criterion with respect to a query geometry 306 are identified. In the primary filter 300, exterior approximations for data geometries are generated. The types of exterior approximations include, but are not limited to, minimum bounding rectangles (MBRs), convex hulls, and quadtree tiles. Typically, identifying all candidate data geometries/objects 304 in the primary filter 300 involves using a spatial index.

In the second stage 302, referred to as a secondary filter, the candidate geometries 304 identified by the primary filter 300 are compared with the query geometry 306 and the exact result set 308 is determined and returned to the user. The secondary filter 302 performs an exact mathematical comparison of all of the candidate geometries 304 with the query geometry 306 to generate the result set. For most spatial datasets, the data geometries typically have hundreds or thousands of vertices and are arbitrarily complex. Secondary filter computation for such geometries takes a long time in contrast to the primary filter 300.

Figure 4A:
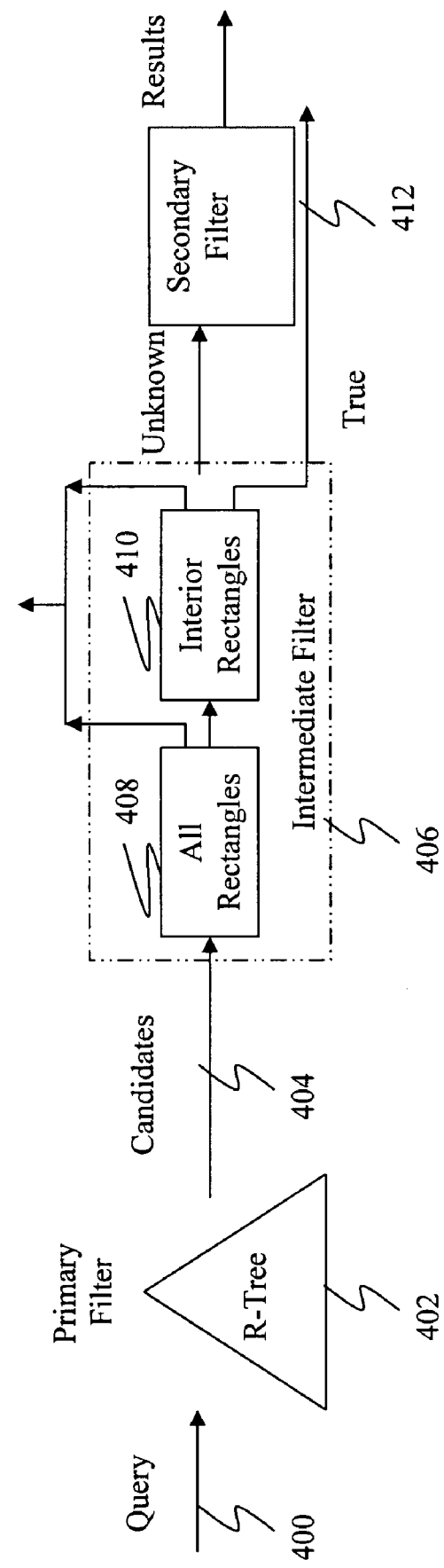
FIG. 4a depicts an exemplary block diagram of a solution for solving window queries including a one-step intermediate filter which can find application according to an embodiment of the present invention.
Figure 4B:
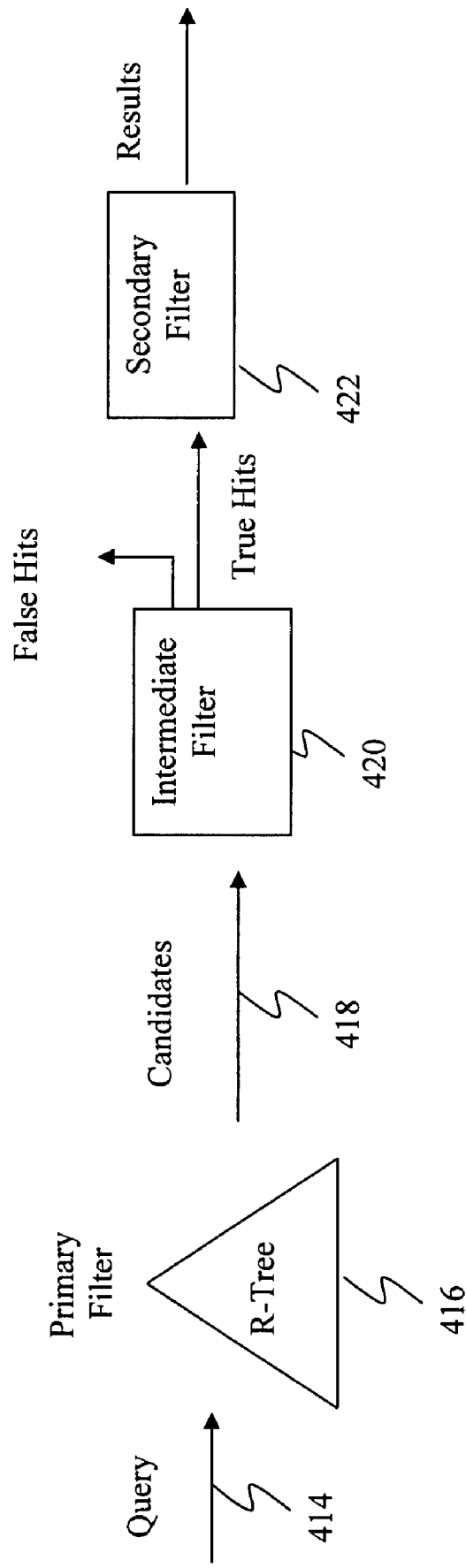
FIG. 4b depicts an exemplary block diagram of a solution for solving window queries including a two step intermediate filter which can find application according to an embodiment of the present invention.

FIGS. 4a–4b depict exemplary block diagrams of solutions for solving window queries including an intermediate filter which can find application according to an embodiment of the present invention. In the FIG. 4a embodiment of the present invention, the solution uses primary filter 402 to generate the MBRs of query geometry 400 and candidate data geometries 404 and determine whether or not they interact. If they do interact, then the query geometry 400 and the candidate data geometries 404 are passed on to the intermediate filter 406. In the FIG. 4a embodiment of the present invention, the intermediate filter 406 includes an all rectangle filter step 408 and an interior rectangles filter 410 step. At the all rectangle filter 410 step, the intermediate filter 406 takes the query q, and a candidate geometry g and returns "true" if the geometry is to be included in the result set, and "false" if not. If the relationship is true, the query-candidate pair is passed to the interior rectangle filter 410 step to further determine the relationship.

In the FIG. 4a embodiment of the present invention, at the interior rectangle filter 410 step, the intermediate filter 406 takes the query q, and a candidate geometry g passed on by the all rectangle filter step and returns "true" if the geometry is to be included in the result set, "false" if not, and "unknown" if it cannot determine the relationship. If the relationship cannot be determined by the interior rectangle filter 410 step, the query-candidate pair is passed to the secondary-filter 412 to determine the exact relationship employing an exact mathematical comparison of the pair. These paths from the intermediate filter 406 are shown with unknown, true, and false labels in FIG. 4a.

In the FIG. 4b embodiment of the present invention, the intermediate filter 414 includes an all rectangle filter step. In the FIG. 4b embodiment of the present invention, the solution uses primary filter 416 to generate the MBRs of query geometry 414 and candidate data geometries 418 and determine whether or not they interact. If they do interact, then the query geometry 414 and the candidate data geometries 418 are passed on to the intermediate filter 420. At the all rectangle filter step, the intermediate filter takes the query q, and a candidate geometry g and returns "true" if the geometry is to be included in the result set, and "false" if not. If the relationship is true, the query-candidate pair is passed to the secondary-filter to determine the exact relationship employing a mathematical comparison. These paths from the intermediate filter are shown with unknown, true, and false labels in FIG. 4b.

Figure 5:
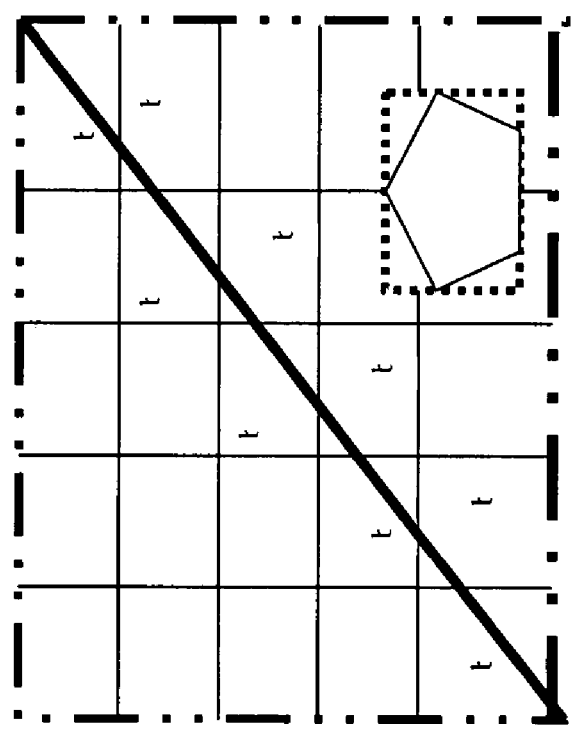
FIG. 5 depicts an exemplary application of an intermediate filter on a query geometry and data geometries according to an embodiment of the present invention.

In the FIG. 5 embodiment of the present invention, the operational behavior of the intermediate filters, shown in FIGS. 4a–4b, on a query geometry Q and data geometry G for different queries is shown. A query geometry Q includes, but is not limited to, lines, polygons, points, and concentric circles. In the FIG. 5 embodiment of the present invention, the query geometry is a line string shown with an exterior approximation (MBR). Using the MBR as the tiling domain, the line string query geometry is tiled. The tiling may be performed by dividing the MBR of the line string geometry in a first direction a plurality of times and dividing the MBR of the line string geometry in a second direction perpendicular to the first direction a plurality of times. For example, if level-1 tiling is chosen, then the MBR is divided into 4 quadrants, if level-2 tiling is chosen each level-1 quadrant is subdivided into 4 sub-quadrants and so on. Each tile may be identified by (xcode, ycode), where xcode and ycode refer to the tile coordinates along the x- and y-axes, respectively.

Among the tiles that cover the query window, the tiles that are interior are identified. Tiles that lie entirely within a query geometry are interior tiles. Boundary tiles are identified from the tiles not identified as interior tiles. Tiles that intersect the boundary of the query geometry are boundary tiles. The combination of interior tiles and boundary tiles are identified as "all tiles." In FIG. 5, the interior tiles are shown with an "i" therein and the boundary tiles are shown with a "b" therein. In FIG. 5, there are no interior tiles, and thus, the boundary tiles corresponds to the all tiles. The all tiles are stored twice, once in an X-ordered array and a second time in a Y-ordered array. The X-ordered array orders the tiles first by the xcode value of the tile and if these match then using the ycode values. The Y-ordered array orders the tiles first using ycode values and then using xcode values for tiles with matching ycodes.

The intermediate filter including the all rectangle filter step and interior rectangle filter step may be utilized in queries as follows. Whenever the query MBR intersects the data MBR, the data MBR may be compared with the all tiles of the query geometry in the all rectangle filter step. If the data MBR intersects the all tile set, then the data geometry is included in the result set and passed to the interior rectangle filter step. Otherwise, the data geometry is excluded from the result set. Then, in the interior rectangle filter step, it is determined whether the data MBR interacts with the query window in a specified manner. The determination of whether a data geometry interacts with interior rectangles in a specified manner may be performed as disclosed in application having U.S. application Ser. No. 09/886,487 filed Jun. 22, 2001 incorporated by reference in its entirety herein. The interior rectangle filter step returns "true" if the geometry is to be included in the result set, "false" if not, and "unknown" if it cannot determine the relationship. If the relationship cannot be determined by the interior rectangle filter step, the query-candidate pair is passed to the secondary-filter to determine the exact relationship employing a mathematical comparison algorithm. In FIG. 5, the data MBR does not intersect the all tiles, and thus, the data geometry is eliminated from the candidate result set and not passed on to the interior rectangle filter step. Accordingly, the two-stage filtering process represented in FIG. 3 may be augmented using such an intermediate filter as represented in FIG. 4a.

The intermediate filter including the all rectangle filter step may be utilized in queries as follows. Whenever the query MBR intersects the data MBR, the data MBR may be compared with the all tiles of the line string query geometry in the all rectangle filter step. If the data MBR intersects the all tile set, then the data geometry is included in the result set and passed to the secondary-filter to determine the exact relationship employing a mathematical comparison. In FIG. 5, the data MBR does not intersect the all tiles and thus is eliminated from the candidate result set and not passed on to the secondary filter. Accordingly, the two-stage filtering process represented in FIG. 3 may be augmented using such an intermediate filter as represented in FIG. 4b.

Figure 6:
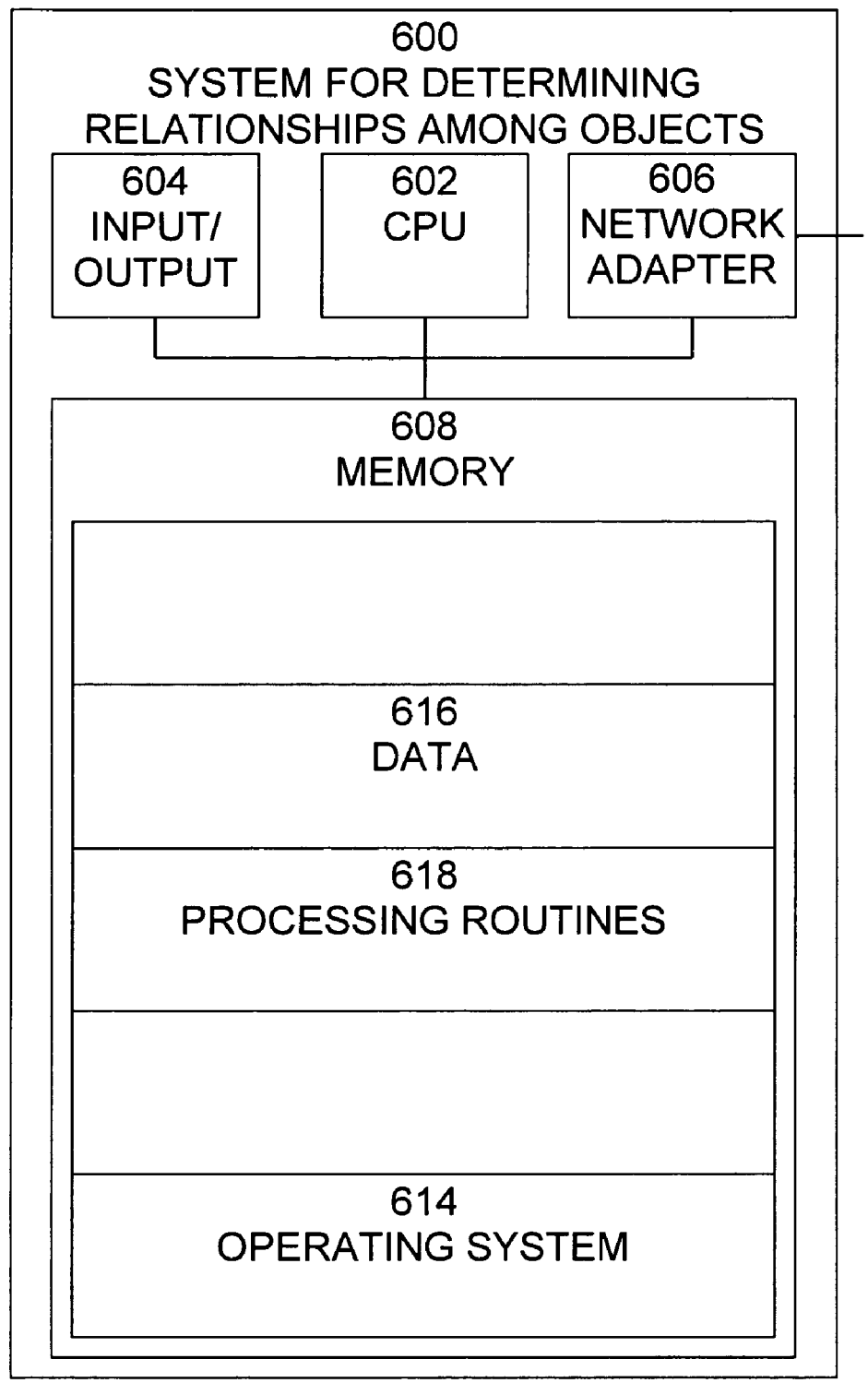
FIG. 6 depicts an exemplary system in which the present invention may find application according to an embodiment of the present invention.

An exemplary block diagram of a system in which the present invention can find application according to an embodiment of the present invention is shown in FIG. 6. In the FIG. 6 embodiment of the present invention, system 600 includes input/output device interface 604 and network adapter 606, system memory 608 and CPU 602. The CPU 602 is connected by a bus 612 or other suitable interface means to system memory 608, input/output device interface, and display interface 604 and network adapter 606. The CPU 602 executes program instructions in order to carry out the functions of the present invention.

Input/output device interface 604 provides the capability to input data to, or output data from system 600. For example, input/output device interface 604 includes, but is not limited to, input devices such as a keypad, mice, touchpads, trackballs, etc., output devices such as video, monitors, printers, etc., and input/output devices such as dialers/modems, etc. Input/output device interface 604 enables input of query geometries and output of result sets. Network adapter 606 interfaces system 600 with a network.

System memory 608 stores program instructions that are executed by, and data that are used and processed by, CPU 602 to perform the functions of system 600. System memory 608 can include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which can use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the FIG. 6 embodiment of the present invention, system memory 608 includes operating system 614, data 616 and software 618. Operating system 614 provides overall system functionality. The data 616 can include data geometries and spatial indexes. The software 618 provides the functionality for performing the functions of the present invention.

While specific embodiments of the present invention have been illustrated and described with respect to R-trees, it will be understood by those having ordinary skill in the art that the present invention is not limited to R-trees and that changes can be made to those embodiments without departing from the spirit and scope of the invention.

What is claimed is:

1. A computer-implemented method for determining relationships among objects represented in a database, the method comprising:
   providing a first filter operable to:
   a plurality of tiles defined in the approximation of the first geometry by dividing the approximation of the first geometry in a first direction a plurality of times and dividing the approximation of the first geometry in a second direction perpendicular to the first direction the plurality of times;
   if a second geometry fulfills a first filter condition with respect to any of the tiles defined in the approximation of the first geometry providing the first geometry and the second geometry to a second filter operable to:
   carry out mathematical comparison of the first geometry and the second geometry; and
   pass the second geometry to a result set based on the result of the mathematical comparison;
   otherwise, excluding the second geometry from the result set.

2. The method according to claim 1, wherein the approximation of the first geometry comprises a minimum bounding rectangle of the first geometry.

3. The method according to claim 1, wherein the tiles are formed by recursively dividing the approximation of the first geometry into two parts in an x dimension and a y dimension.

4. The method according to claim 1, wherein the first filter condition comprises an intersection between at least one tile and the second geometry.

5. The method according to claim 1, wherein the second filter condition comprises an intersection between at least one tile interior to the first geometry and the second geometry.

6. The method according to claim 5, further comprising:
   determining an approximation of the second geometry; and
   defining a plurality of tiles in the approximation of the second geometry;
   wherein determining if the second geometry fulfills the first filter condition comprises comparing the tiles of the second geometry with the tiles of the first geometry.

7. The method according to claim 6, wherein the approximation of the second geometry comprises a minimum bounding rectangle.

8. The method according to claim 1, further comprising:
   ordering the tiles in the first dimension and the second dimension.

9. The method according to claim 1, wherein the first geometry comprises a query geometry and the second geometry comprises a data geometry.

10. The method according to claim 1, wherein the first filter condition comprises at least one member selected from the group comprising:

the second geometry lies entirely within the tiles defined in the approximation of the first geometry;

the second geometry intersects the tiles defined in the approximation of the first geometry; and a border of the second geometry touches a border of the approximation of the first geometry.

11. The method according to claim 1, wherein one of the first object and the second object comprises an object in a database.

12. The method according to claim 11, wherein the database is organized in an R-tree hierarchy.

13. A computer-implemented method for determining relationships among objects represented in a database, the method comprising:

providing a first filter operable to:

receive an a minimum bounding rectangle defined for a first geometry having;

a plurality of tiles defined in the minimum bounding rectangle of he first geometry by recursively dividing the minimum bounding rectangle into two parts a plurality of times in an x-dimension and y-dimension;

if a second geometry fulfills a first filter condition with respect to any of the tiles defined in the approximation of the first geometry providing the first geometry and the second geometry to a second filter operable to:

carry out a mathematical comparison of the first geometry and the second geometry; and pass the second geometry to a result set based on the result of the mathematical comparison;

otherwise, excluding the second geometry from the result set.

14. The computer implemented method according to claim 13, wherein the first filter condition comprises an intersection between at least one tile and the second geometry.

15. The computer implement method according to claim 13, wherein the first filter condition comprises at least one member selected from the group comprising:

the second geometry lies entirely within the tiles defined in the approximation of the first geometry;

the second geometry intersects the tiles defined in the approximation of the first geometry; and a border of the second geometry touches a border of the approximation of the first geometry.

16. A computer program product for performing a process for determining relationships among objects represented in a database, comprising:

a computer readable medium; and computer program instructions, recorded on the computer readable medium, executable by a processor, for performing the steps of providing a first filter operable to:

receive an approximation defined for a first geometry having;

a plurality of tiles defined in the approximation of the first geometry by dividing the approximation of the first geometry in a first direction a plurality of times and dividing the approximation of the first geometry in a second direction perpendicular to the first direction the plurality of times;

if a second geometry fulfills a first filter condition with respect to any of the tiles defined in the approximation of the first geometry providing the first geometry and the second geometry to a second filter operable to:

carry out a mathematical comparison of the first geometry and the second geometry; and pass the second geometry to a result set based on the result of the mathematical comparison;

otherwise, excluding the second geometry from the result set.

17. The computer program product according to claim 16, wherein the first filter condition comprises an intersection between at least one tile and the second geometry.

18. The a computer program product according to claim 16, wherein the tiles are formed by recursively dividing the approximation of the first geometry into two parts in an x dimension and a y dimension.

19. A system for performing a process for determining relationships among objects represented in a database, comprising:

a processor operable to execute computer program instructions; and a memory operable to store computer program instructions executable by the processor, for performing the steps of:

providing a first filter operable to:

receive an approximation defined for a first geometry having;

a plurality of tiles defined in the approximation of the first geometry by dividing the approximation of the first geometry in a first direction a plurality of times and dividing the approximation of the first geometry in a second direction perpendicular to the first direction the plurality of times;

if a second geometry fulfills a first filter condition with respect to any of the tiles defined in the approximation of the first geometry providing the first geometry and the second geometry to a second filter operable to:

carry out a mathematical comparison of the first geometry and the second geometry; and pass the second geometry to a result set based on the result of the mathematical comparison;

otherwise, excluding the second geometry from the result set.

20. The system according to claim 19, wherein the first filter condition comprises at least one member selected from the group comprising:

the second geometry lies entirely within the tiles defined in the approximation of the first geometry;

the second geometry intersects the tiles defined in the approximation of the first geometry; and a border of the second geometry touches a border of the approximation of the first geometry.

* * * * *